(12) United States Patent
Nagel et al.

(10) Patent No.: US 7,802,389 B2
(45) Date of Patent: Sep. 28, 2010

(54) LABEL HOLDER FOR MERCHANDISE DISPLAY HOOKS AND METHOD OF MAKING SAME

(75) Inventors: Thomas O. Nagel, Blairstown, NJ (US); Marc D. Huntington, Berwick, PA (US)

(73) Assignee: Trion Industries, Inc., Wilkes-Barre, PA (US)

( * ) Notice: Subject to any disclaimer, the term of this patent is extended or adjusted under 35 U.S.C. 154(b) by 154 days.

(21) Appl. No.: 12/134,580

(22) Filed: Jun. 6, 2008

(65) Prior Publication Data

US 2008/0307687 A1 Dec. 18, 2008

Related U.S. Application Data

(60) Provisional application No. 60/943,365, filed on Jun. 12, 2007.

(51) Int. Cl.
*G09F 3/00* (2006.01)
(52) U.S. Cl. .................................................. 40/642.01
(58) Field of Classification Search .............. 40/642.01, 40/642.02, 657; 211/106, 106.01; 248/690, 248/215
See application file for complete search history.

(56) References Cited

U.S. PATENT DOCUMENTS

| | | | | | |
|---|---|---|---|---|---|
| 3,469,813 | A | * | 9/1969 | Rizzi | 248/475.1 |
| 4,246,710 | A | * | 1/1981 | Mixer | 40/651 |
| 4,319,731 | A | * | 3/1982 | Pfeifer | 248/223.41 |
| 4,351,440 | A | * | 9/1982 | Thalenfeld | 211/57.1 |
| 4,593,824 | A | * | 6/1986 | Pfeifer | 211/57.1 |
| 4,850,557 | A | | 7/1989 | Valiulis | |
| 5,236,163 | A | | 8/1993 | Valiulis | |
| 5,979,674 | A | * | 11/1999 | Thalenfeld | 211/57.1 |
| 6,193,079 | B1 | * | 2/2001 | Wiemer | 211/59.1 |
| 6,279,256 | B1 | * | 8/2001 | Norolof et al. | 40/642.01 |
| 6,299,004 | B1 | * | 10/2001 | Thalenfeld et al. | 211/184 |
| D470,535 | S | | 2/2003 | Valiulis | |
| D470,893 | S | | 2/2003 | Valiulis | |
| D472,278 | S | | 3/2003 | Valiulis | |
| D476,375 | S | * | 6/2003 | Zadak et al. | D20/43 |
| 6,581,314 | B2 | | 6/2003 | Valiulis | |
| D516,633 | S | * | 3/2006 | Kosir | D20/44 |
| 7,089,695 | B2 | * | 8/2006 | Fast et al. | 40/642.01 |
| 7,530,188 | B2 | * | 5/2009 | Beilenhoff et al. | 40/642.01 |

\* cited by examiner

*Primary Examiner*—Lesley Morris
*Assistant Examiner*—Christopher E Veraa
(74) *Attorney, Agent, or Firm*—St. Onge Stewart Johnston & Reens, LLC

(57) ABSTRACT

A label holder for displaying information labels at the front of merchandise display hooks, and method for making the label holder. The label holder is of inexpensive continuously extruded construction, which is inexpensively processed after extrusion to eliminate the typical shortcomings of conventional extruded label holders. The extruded body form is cut to usable length and subjected to a plurality of die cutting operations on the back or mounting portion of the label holder, to form positioning and retention features. The label holder is thus provided with many if not most of the beneficial features of specially molded label holders, without incurring the greater expense involved in the molding process. The label holder is designed to accommodate mounting on label holders of several wire sizes commonly found in use in merchandise displays.

12 Claims, 4 Drawing Sheets

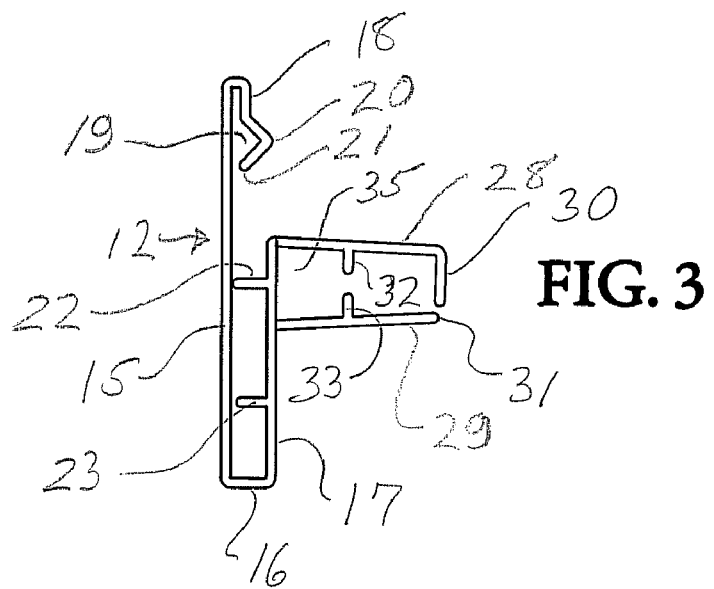
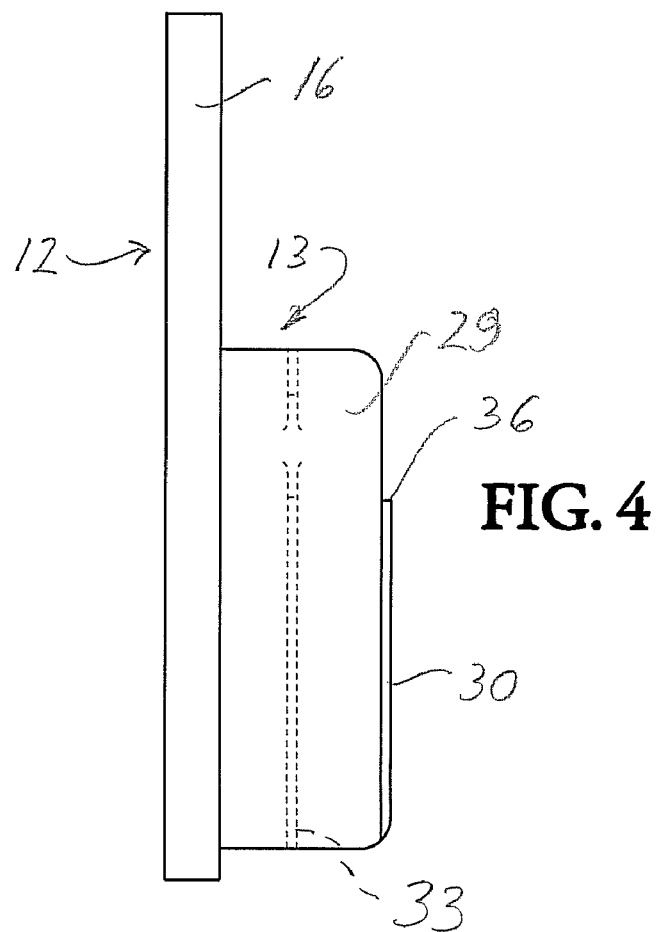

LABEL HOLDER FOR MERCHANDISE DISPLAY HOOKS AND METHOD OF MAKING SAME

RELATED APPLICATIONS

This application claims the priority of Provisional Application Ser. No. 60/943,365, filed Jun. 12, 2007.

BACKGROUND OF THE INVENTION

Mass merchandisers in particular, and smaller marketers as well utilize great numbers of merchandise display hooks, which are mounted on perforated panels, slat walls or the like accommodating variable placement of the hooks. The hooks support a plurality of items of merchandise, usually packaged with header cards formed with openings at the top to receive the display hook.

Large numbers of display hooks are formed with a label-mounting arm extending forwardly, above the merchandise supporting arm and provided at its outer end extremity with a means for mounting a label displaying pricing and other information. A widely used form of such merchandise hooks is provided with a label-mounting arm having an L-shaped bend at its forward extremity, disposed horizontally and at right angles to the primary label mounting arm and serving as a label support element. The transversely disposed label support element provides a means for mounting a plastic label holder on which, or in which, a label is positioned with the desired pricing and other information.

The above described display hooks are in widespread use throughout the world, and are very popular with merchandisers. Nevertheless, they are subject to certain shortcomings having to do with the forms of plastic label holders mounted thereon. One common form is of extruded construction, with a groove running across the back wall of the label holder for receiving the label-mounting arm of the hook. This form of label holder is inexpensive, but has certain shortcomings in that careless workers can easily cause the label holders to be installed in an offset position relative to the display hook, or the label holder, if installed properly, can later become dislodged to an offset position, lending a disordered appearance to an overall display. Additionally, the display hooks, which are formed of wire, are manufactured and sold in several wire sizes, to accommodate displayed merchandise of different sizes and weights. The extruded form of label holder typically will require a separate groove for each wire size it is expected to accommodate, this not only adds extra material, but requires that the store personnel insert the display hook in the proper groove.

Because of the need and desirability for properly orienting and positioning the plastic label holder with respect to the display hook, such label holders frequently are of molded plastic construction. Molded label holders tend to be relatively costly, however, and merchandisers thus tend to prefer label holders of extruded construction, which are less costly, although in many cases functionally inferior.

SUMMARY OF INVENTION

The present invention is directed to a novel and improved form of plastic label holder, for mounting at the outer end of a display hook of the type described above, to serve as an original or replacement label holder. More specifically, the invention is directed to a label holder which is of extruded construction, and therefore capable of being produced at low cost, but which at the same time is the functional equivalent of more expensive, molded label holders with respect to its mounting on the display hook. The label holder of the invention is configured for a lateral slide-on assembly at the outer end of a display hook having an L-shaped mounting for the label holder. This is a common way of mounting an extruded label holder. The label holder of the invention, however, even though of extruded construction includes advantageous features that prevent improper mounting of the label holder and which further engage and lock the label holder in an accurately centered position on the display arm. The new label holder thus provides much of the functionality of a molded label holder but with the economics afforded by extrusion manufacture.

In accordance with one aspect of the invention, a label holder is formed of extruded construction, including extruded features along a back wall panel thereof for receiving an L-shaped outer end portion of a display hook. In its as-extruded form, however, the display hook-engaging element of the label holder comprises a pair of upper and lower primary flanges defining a rearwardly opening back channel, and a downwardly extending back flange that substantially closes the backside of the groove and effectively prevents a hook from being fully inserted therein. Additionally, a pair of opposed vertical flanges project from the primary flanges and form between them a horizontally extending slot of substantially narrower width than the diameter of the display hook on which the label holder is expected to be mounted. Thus, in the as-extruded form, the label holder is not suitable for the purposes of the invention. However, immediately after the extrusion operations, the label holder is subjected to a plurality of die-cut operations to reconfigure its back channel such that it not only accepts the L-shaped end of the display hook, but more importantly automatically causes the label holder to be properly centered with respect to the hook on which it is mounted.

An additional and important feature of the invention resides in a configuration of the label holder back channel such that a single channel can accommodate a plurality of wire sizes (typically three). To this end, the primary flanges defining the back channel of the label holder are configured to converge in a rearward direction, having a first and larger dimension at the back wall of the label holder, and converging rearwardly to a smaller channel width dimension at the rearward extremities of the primary flanges. When a wire of minimum dimensions is inserted, the outer edges of the principal flanges will bear lightly against the top and bottom surfaces of the wire. When wires of larger diameter are inserted, the outer edges of the primary flanges are displaced vertically to accommodate the larger diameter. The spacing of the flanges at the plane of the back wall of the label holder preferably is approximately the same of the diameter of the maximum wire size to be accommodated.

To ensure that the label holder is securely positioned in properly centered relation on the display wire, the opposed vertical flanges, formed on the horizontally projecting primary flanges of the back channel, are die cut to form detent recesses. Thus, when the label holder is installed at the end of a display hook, the wire initially is forced between the opposed and spaced-apart edges of the vertical flanges. The spacing between the opposed flanges is less than the diameter of the minimum wire to be accommodated, so the flanges are separated as the wire is forced in and return to a normal spacing when the wire reaches the detent recesses. The wire is then positioned within the die cut recesses such that the label holder is, in practical effect, locked onto the wire of the display hook and cannot be dislodged unless intentionally removed from the hook.

The invention is also directed in part to a method of manufacture of the above described label holder comprising continuously extruding the body form of the holder to form front portions, for displaying labels, and back portions, for mounting on a display hook. The extruded form is cut to predetermined length, and the back portions thereof are subjected to one or more die cutting operations to form positioning surfaces, enabling the label holder to automatically be properly centered with respect to a display hook when applied thereto, and to be effectively retained in such centered position against accidental dislodgment.

For a more complete understanding of the above and other features and advantages of the invention, reference should be made to the following detailed description of a preferred embodiment, and to the accompanying drawings.

DESCRIPTION OF THE DRAWINGS

FIG. 3 is a side elevational view of the label holder of FIG. 1.

FIG. 4 is a bottom elevational view of the label holder of FIG. 1.

DESCRIPTION OF A PREFERRED EMBODIMENT

Figure 7:
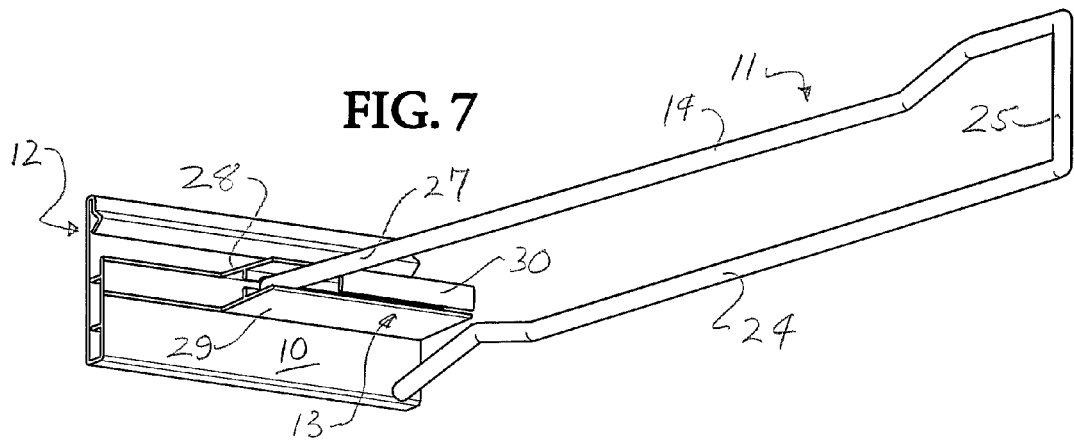
FIG. 7 is a perspective view, similar to FIG. 1, but showing the label holder as mounted on a display hook.
Figure 8:
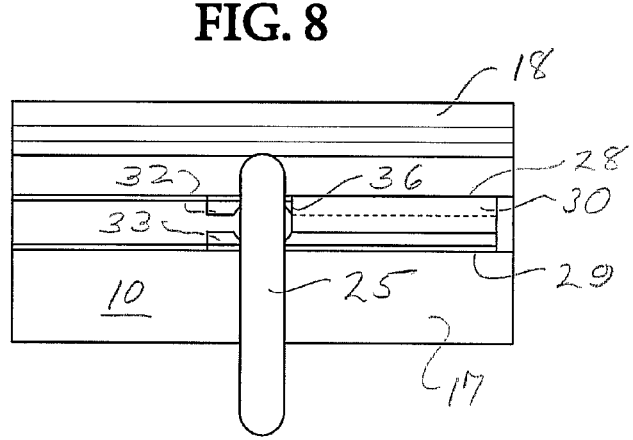
FIG. 8 is a back elevational view of the label holder mounted on a display hook.

Referring now to the drawings, the reference numeral 10 designates generally the new label holder of the invention which is formed of a suitable plastic material (or materials), preferably rigid PVC or other relatively hard plastic, and is initially formed by a continuous extrusion process. As initially extruded, of course, the label holder has a uniform cross section throughout its length. The extruded material is cut to a suitable length, as may be desired by storekeepers, and then processed by one or more die cutting operations, to be described, to derive its final form, adapted in an advantageous manner for mounting on a display hook 11 (FIGS. 7, 8). The label holder 10 comprises a front portion 12 for retaining and displaying an information label (not shown) and a back portion 13 for mounting the label holder onto a label-mounting arm 14 of the display hook 11.

In the illustrated form of the invention, the front portion of the label holder comprises a front panel 15, formed of clear plastic material, a short bottom wall 16, and a back wall 17 that extends upward from the bottom wall 16, typically for somewhat more than one-half the height of the front wall 15 and forms a bottom label-receiving pocket. Along the upper edge of the front wall 12, there is a reversely bent flange 18 extending downward a short distance from the upper edge and forming an upper pocket 19 for retaining an upper edge of a label (not shown). Preferably, the pocket flange 18 has a lower portion 20 shaped somewhat in the form of a horizontal "V" and having a lower edge 21 positioned closely spaced from the back surface of the front wall 15.

Near the upper edge of the back wall 17 is a forwardly projecting rib 22 that preferably projects into contact with the back surface of the front wall 15. Lower down on the back wall is a similar forwardly projecting rib 23, but preferably the second rib is slightly out of contact with the front wall 15.

A label is inserted into the front portion of the label holder by drawing forward slightly on the upper edge of the front wall 15 and sliding a label laterally into the upper and lower pockets. When the front wall 15 is released, the label is frictionally gripped between the upper flange 22 and the back surface of the front wall 15.

Pursuant to the invention, the back portion 13 of the label holder is provided with a novel and advantageous configuration by means of which the label holder may be mounted securely on an L-shaped mounting arm 14 of the display hook 11. A typical display hook, shown in FIGS. 7 and 8, comprises a product display arm 24, which is joined with the label-mounting arm 14 by means of a vertical connecting portion 25 at the back of the hook. A representative but non-limiting form of display hook is formed of metal wire, shaped in the form shown in FIG. 7 and is mounted to a display panel by means of a suitable base (not shown) which receives the back portion 25 of the hook. The label-mounting arm 14 of the display hook has an L-shaped outer end portion, including an end section 26 (FIG. 8) which is bent at right angles to an outer end portion 27 of the label-holding arm 14.

The label holder of the invention, as will be explained hereinafter, is designed and constructed to accommodate display hooks of different wire sizes. By way of illustration, and not of limitation, a preferred form of the invention can be designed to accommodate standard wire diameters of 0.212 inch, 0.225 inch and 0.250 inch.

Figure 1:
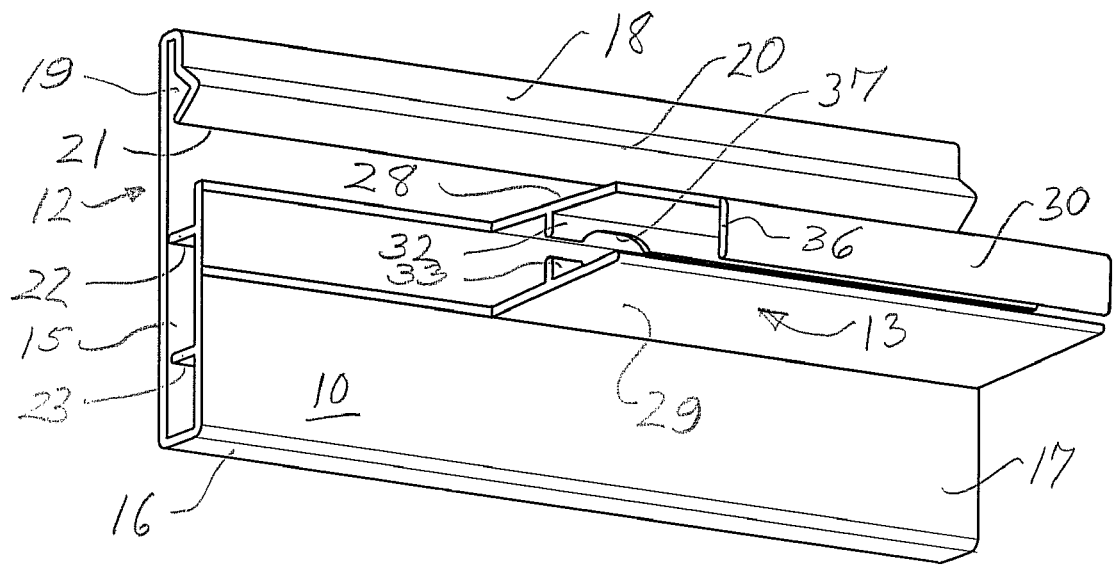
FIG. 1 is a perspective view, from behind and below, of a label holder according to the invention.

In its initial, as-extruded form, the label holder of FIG. 1 is comprised of upper and lower vertically spaced primary flanges 28, 29 extending rearward from the back wall 17. A back flange 30 extends downward from a back edge of the upper flange 28 and terminates somewhat above the back edge 31 of the lower flange 29, substantially closing the back opening between the flanges 28, 29. A pair of opposed retention flanges 32, 33 extend from the respective primary flanges 28, 29 forming a space 34 between them which is substantially narrower than the wire diameter of the smallest size hook intended to be accommodated by the label holder. In a typical and advantageous embodiment of the invention, the space 34 between the retention flanges may be approximately one-third the space between the primary flanges 28, 29, and the projecting lengths of the respective retention flanges 32, 33 may be of a similar dimension.

Figure 5:
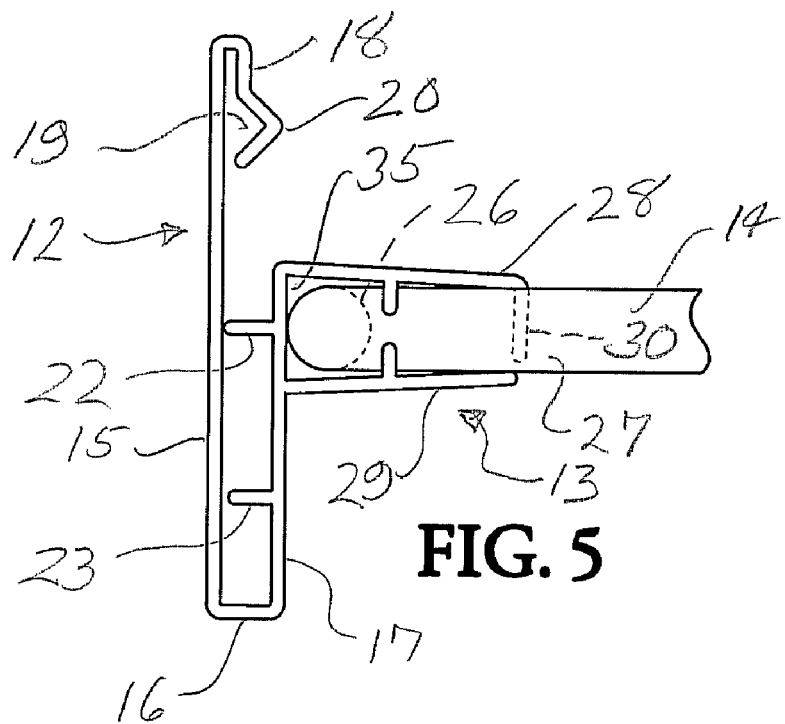
FIG. 5 is a side elevational view of the label holder, illustrating the label holder as mounted on a display hook of small wire size.
Figure 6:
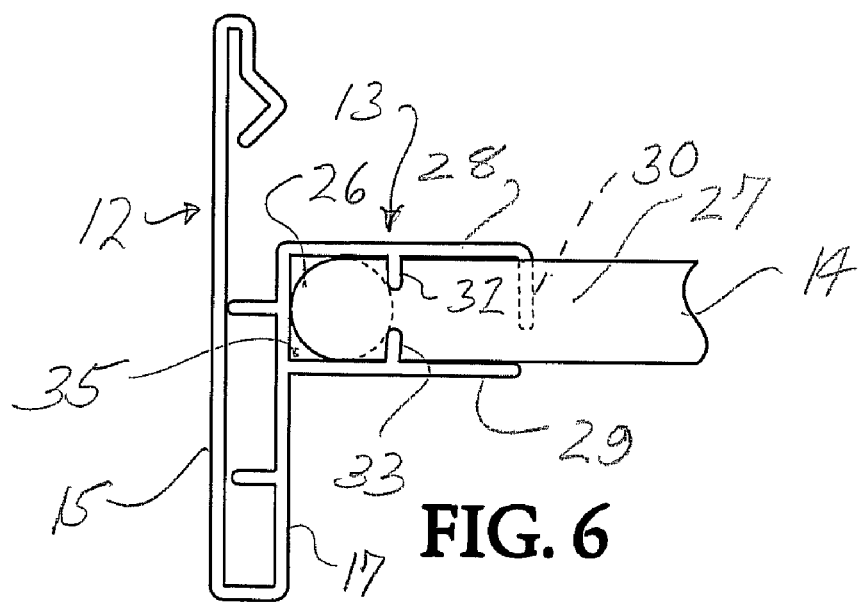
FIG. 6 is a side elevational view, similar to FIG. 5, illustrating the label holder mounted on a display hook of larger wire diameter.

Pursuant to one aspect of the invention, the vertical spacing between the upper and lower primary flanges 28, 29 corresponds to a diameter of the wire for the largest size hook to be accommodated by the label holder. In the representative example, this should be 0.250 inch. Additionally, the spacing of the retention flanges 32, 33 from the back surface of the back wall 17 also corresponds to the maximum wire diameter to be accommodated. Accordingly, the upper portion of the back wall 17, the inner portions of the primary flanges 28, 29, and the retention flanges 32, 33 together form a longitudinally extending enclosure 35 for receiving the right angular outer end portion 26 of the label-holding arm 14 (see FIGS. 5 and 6). The largest size wire (FIG. 6) occupies substantially the entire space of the enclosure, while the smallest diameter wire (FIG. 5) is received easily within the enclosure, with clearance all around. Also in accordance with certain principles of the invention, the primary flanges 28, 29 are rearwardly convergent, as shown particularly in FIGS. 3 and 5. Thus, whereas the spacing of the flanges 28, 29 at the back wall 17 corresponds to the maximum wire size, the vertical spacing between the rear edge extremities of these flanges corresponds to the minimum wire diameter to be accommodated. Accordingly, as shown in FIG. 5, when the label holder is mounted on a hook of the minimum wire diameter, the outer end portions of the flanges 28, 29 lightly grip the top and bottom surfaces of the wire to steady the label holder on its mounting. When the label holder is mounted on a maximum wire size, as shown in FIG. 6, the outer end portions of the flanges 28, 29 are resiliently displaced by the presence of the larger wire to a more or less parallel configuration shown in FIG. 6.

According to one aspect of the invention, the back flange 30 is cut away by a post-extrusion die cutting operation over a length thereof commencing at the left side of the label holder (as viewed from the back as in FIG. 1) to a position slightly beyond the center of the label holder, for example, 1/8th inch beyond the center. This die cut operation forms an abutment surface 36 at the cut (left side) end of the back flange 30. Accordingly, when the label holder is installed on the mounting arm 14, by inserting the bent outer end portion 26 into the enclosure 35, an outer end of the main portion 27 of the label holder will engage the abutment surface 36 to prevent further insertion of the wire, thus positioning the label holder with substantial accuracy in a centered relation to the mounting arm 14. Desirably, the vertical dimension of the back flange 30 is greater than half the diameter of the wire-mounting arm received therein, such that the abutment 36 forms a positive positioning stop and cannot be deflected by applying greater pressure.

Figure 2:
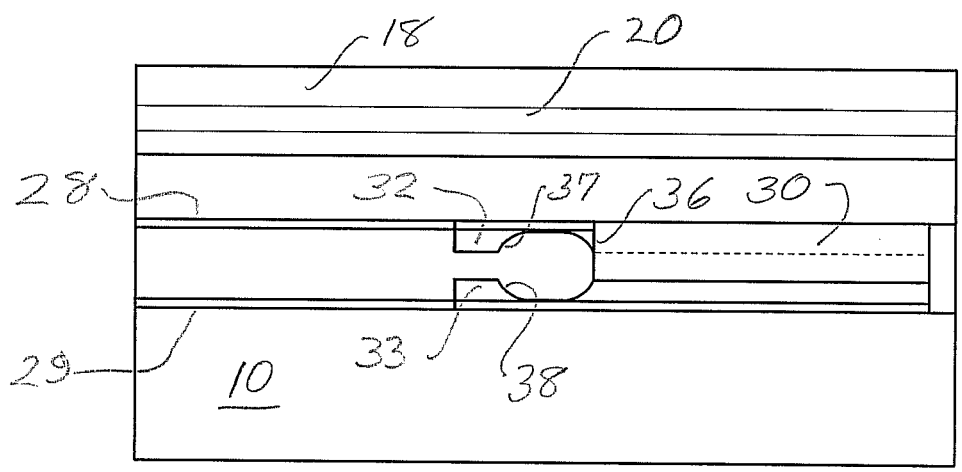
FIG. 2 is a back elevational view of the label holder of FIG. 1.

As shown best in FIGS. 1 and 2, the retention flanges 32, 33 are die cut at a location immediately adjacent to the abutment stop 36 to form detent recesses 37, 38. The arrangement is such that, as the label holder is applied over the bent outer portion 26 of the label-holding arm, and before the arm comes in contact with the positioning abutment 36, the retention flanges 32, 33 are forced apart by the rounded contours of the wire end 27. Further movement of the label holder causes the wire to enter the detent recesses 37, 38, as shown best in FIG. 8. The retention flanges thereupon close down on the wire and securely retain the wire within the recesses 37, 38. Removal of the label holder from the hook, after such installation, requires considerable force to be applied to separate the retention flanges and enable the wire to move out of the detent recesses. Accordingly, it is most unlikely that the label holder will ever become accidentally dislodged from its mounting on the display hook. Intentional removal of the label holder is nevertheless accommodated by shaping the left sides of the detent recesses to enable the retention flanges 32, 33 to be separated by the application of sufficient lateral force to the label holder.

To advantage, the left ends (as viewed in FIGS. 1 and 2) of the primary flanges 28, 29 are removed in a die cutting operation over a distance from the end of the label holder to a point spaced a short distance (for example, 1/8th inch) short of the detent recesses 37, 38. Preferably, the entire end portions of the flanges 28, 29 are removed, flush with the level of the back surface of the back wall 17. Alternatively, the cut-away portions of the primary flanges 28, 29 may extend to a point slightly rearward of the back wall 17, leaving short projections from the back wall to serve as a guide to assist in the initial alignment of the label when initially applying the label to a mounting arm 14.

As shown particularly in FIGS. 2 and 4, all of the flanges at the back of the label holder may be removed for a distance at the right end of the label holder (as viewed from the back) for aesthetic purposes.

The new label holder provides substantially all of the functionality of expensive, injection molded label holders, while maintaining manufacturing cost at a level far below molding costs and not significantly greater than the cost of conventional extruded label holders. With the device of the present invention, the basic unit may be manufactured in endless lengths by extrusion procedures, cut to length, and then die cut to remove certain portions of the back structure. As a result, the new label holder has none of the disadvantages of extruded label holders in that the label holder is positively and accurately positioned on the label-holding arm of a display hook, and is effectively retained on the display hook against accidental dislodgement or misalignment.

The label holder of the invention also has important advantages in that a single device can accommodate its mounting on wire hooks of several standard sizes, providing a great deal of versatility in the useage of the label holder and a very significant savings to the merchandiser in avoiding the need for inventorying a large number of different label holders to accommodate different sizes of hooks that may be encountered in the store.

It should be understood, of course, that the specific forms of the invention herein illustrated and described are intended to be representative only, as certain changes may be made therein without departing from the clear teachings of the disclosure.

We claim:

1. A label holder for mounting at the end of a wire label-mounting arm of generally L-shaped configuration having an outwardly extending first portion and a transversely extending second portion joining an outer end of said first portion and disposed at right angles thereto, which comprises
    (a) a label holder body formed of an extruded length of plastic material, cut to predetermined length,
    (b) said label holder body initially being of uniform cross section throughout and having a front portion for receiving an information label, and a back portion for mounting on said label mounting arm,
    (c) said back portion comprising a pair of vertically spaced, rearwardly projecting primary flanges forming a back channel for mounting on an outer end of said label-mounting arm,
    (d) a vertically extending back flange joining a rearward portion of one of said primary flanges and extending toward the other of said primary flanges,
    (e) said vertically extending back flange having a portion thereof, extending from one end of said label holder to a point a short distance beyond a center of said label holder, cut away whereby the remaining portion of said back flange forms an abutment stop engageable with an outer portion of a label-holding arm to position said label holder in substantially centered relation to said label-holding arm.

2. A label holder according to claim 1, wherein
    (a) at least one retention flange extends from one of the primary flanges toward the other,
    (b) said retention flange being spaced rearwardly of the front portion of said label holder body a distance sufficient to enable said second portion of said label-mounting arm to be inserted between a rearward facing surface of said label holder body and a forwardly facing surface of said retention flange, and
    (c) said retention flange having a detent-forming recess therein, closely adjacent the abutment stop formed by said back flange, for engagement with said label-mounting arm to retain said label holder in a center-mounted position on said label-mounting arm.

3. A label holder according to claim 2, wherein
   (a) a second retention flange extends from said other primary flange toward the first mentioned retention flange,
   (b) said retention flanges define a space between them of less height than a wire diameter of a minimum size label holding arm to be accommodated by the label holder, and
   (c) detent-forming recesses are formed in opposed relation in each of said retention flanges.

4. A label holder according to claim 2, wherein
   (a) said retention flange is cut away over a length thereof commencing at said first end of said label holder and extending to a point adjacent said detent recess, and
   (b) said primary flanges are at least partly cut away over a length thereof commencing at said first end and extending to said point adjacent said detent recess.

5. A label holder according to claim 1, wherein
   (a) said primary flanges are joined integrally with said front portion and are spaced apart at said front portion a distance corresponding to a wire diameter of a maximum size label holding arm to be accommodated by said label holder, and
   (b) said primary flanges are disposed in rearwardly convergent relation such that rearward edge portions of said primary flanges are spaced apart a distance corresponding to a wire diameter of a minimum size label holding arm to be accommodated by said label holder.

6. A label holder for mounting at the end of a wire label-mounting arm of generally L-shaped configuration having an outwardly extending first portion and a transversely extending second portion joining an outer end of said first portion and disposed at right angles thereto, which comprises
   (a) a label holder body formed of an extruded length of plastic material, cut to predetermined length,
   (b) said label holder body initially being of uniform cross section throughout and having a front portion for receiving an information label, and a back portion for mounting on said label mounting arm,
   (c) said back portion comprising a pair of vertically spaced, rearwardly projecting primary flanges, forming a back channel for mounting on an outer end of said label-mounting arm,
   (d) at least one flange extending vertically from one of said primary flanges and spaced rearwardly from said front portion,
   (e) said vertically extending flange comprising a back flange extending from a rearward edge of one of said primary flanges a distance of at least one-half of the spacing between rearward edges of said primary flanges, and
   (f) a portion of said back flange, extending from one end of said label holder to a point a short distance beyond a center of said label holder, being cut away, whereby an edge of said back flange adjacent said center forms an abutment stop to position said label holder in said substantially centered relation to said label-holding arm.

7. The method of manufacturing a label holder of the type adapted for mounting on a label-holding arm having an outwardly extending arm portion and an outer end portion disposed at right angles to said arm portion, which comprises
   (a) extruding a label holder body form having a front portion for holding a label and a back portion for engagement with said label-holding arm,
   (b) cutting said body form to a predetermined length desired for a label holder body,
   (c) the back portion of said body form having upper and lower, horizontally disposed, vertically spaced apart primary flanges extending rearwardly from a back wall thereof and a positioning flange extending vertically from a portion of one of said primary flanges toward a portion of the other primary flange to at least partly close a space between said primary flanges,
   (d) said primary flanges forming a back channel for the reception of the right angularly disposed outer end portion of said mounting arm,
   (e) said positioning flange comprising a vertical back flange extending from a rear portion of said one primary flange toward a rear portion of the other primary flange, and
   (f) die cutting said back flange to remove a portion thereof extending from one edge of said label holder to a point adjacent to but beyond a center point of said label holder to form an abutment stop for positioning said label holder in centered relation to a label holding arm on which it is mounted.

8. The method of claim 7, wherein
   (a) the step of extruding said label holder body form comprises forming, in addition to said back flange, at least one retention flange extending from one of said primary flanges toward the other, and
   (b) said die cutting comprises the step of die cutting a detent recess in said at least one retention flange at a location close to a center point of said label holder for reception and substantially fixed retention of a portion of said label-holding arm.

9. The method of claim 8, wherein
   (a) the step of extruding said label holder body form includes forming a second retention flange positioned in opposed relation to and extending toward said at least one retention flange,
   (b) said retention flanges forming a space between them, and
   (c) said die cutting comprises the step of die cutting opposed detent recesses in each of said retention flanges for engagement with upper and lower portions of a label holding arm.

10. The method of claim 9, wherein
    (a) said die cutting comprises the step of die cutting and removing portions of said primary flanges and said retention flanges over a distance from said one edge of said label holder to a point closely adjacent said detent recesses.

11. The method of claim 10, wherein
    (a) the step of die cutting and removing portions of said primary flanges removes said portions to the full depth of said flanges.

12. The method of claim 10, wherein
    (a) said label holder body includes a back flange extending from a rear portion of said one primary flange toward a rear portion of the other primary flange, and
    (b) said die cutting comprises the step of die cutting said back flange to remove a portion thereof extending from said one edge of said label holder to a point adjacent to but beyond a center point of said label holder to form a fixed abutment stop for centering said label holder on a label mounting arm when said arm is received in said detent recesses.

* * * * *